US008265457B2

(12) United States Patent  (10) Patent No.: US 8,265,457 B2
Baum et al.  (45) Date of Patent: Sep. 11, 2012

(54) PROXY EDITING AND RENDERING FOR VARIOUS DELIVERY OUTLETS

(75) Inventors: Geoffrey King Baum, Palo Alto, CA (US); Lalit Balchandani, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1520 days.

(21) Appl. No.: 11/748,236

(22) Filed: May 14, 2007

(65) Prior Publication Data
US 2008/0285939 A1 Nov. 20, 2008

(51) Int. Cl.
G11B 27/00 (2006.01)
(52) U.S. Cl. ........................................................ 386/281
(58) Field of Classification Search .................... 386/281
See application file for complete search history.

(56) References Cited

U.S. PATENT DOCUMENTS

| | | | |
|---|---|---|---|
| 6,535,686 B1 * | 3/2003 | Yanase et al. ................. | 386/281 |
| 6,956,574 B1 | 10/2005 | Cailloux et al. | |
| 7,069,310 B1 | 6/2006 | Bartholomew | |
| 2002/0116716 A1 | 8/2002 | Sideman | |
| 2003/0123840 A1 * | 7/2003 | Fujinami ........................ | 386/35 |
| 2005/0091251 A1 * | 4/2005 | Ramarao ........................ | 707/101 |
| 2005/0276573 A1 * | 12/2005 | Abbate ............................ | 386/52 |
| 2006/0156219 A1 * | 7/2006 | Haot et al. .................. | 715/500.1 |
| 2007/0168462 A1 * | 7/2007 | Grossberg et al. ............ | 709/217 |

OTHER PUBLICATIONS

International Search Report mailed Aug. 11, 2008 in counterpart International Application No. PCT/US08/63460.

* cited by examiner

*Primary Examiner* — Thai Tran
*Assistant Examiner* — Jose Mesa
(74) *Attorney, Agent, or Firm* — Kilpatrick Townsend & Stockton LLP (57) ABSTRACT

A method, apparatus and computer program product provides for a proxy media editor to combine editing, rendering, and a plurality of output specifications via a unified platform. The proxy media editor accesses at least one output specification and an edit decision list stored on a server system. The proxy media editor receives a request for media output at the server system, the media output associated with an edit decision list stored on the server system. The proxy media editor renders, at the server system, the media output according to the output specification and the edit decision list. The proxy media editor delivers, from the server system, the media output via a media delivery channel compatible with the output specification. Thus, a user can create a single edited video composition in a hosted web-based environment which can dynamically meet the exact requirements of various delivery channels.

19 Claims, 7 Drawing Sheets

500

310 ACCESS THE EDIT DECISION LIST

510 ACCESS AN XML-BASED TEXT FILE COMPRISING AT LEAST ONE OF THE GROUP CONSISTING OF:
AT LEAST ONE INSTRUCTION REPRESENTING MODIFICATIONS TO BE APPLIED TO ONE OR MORE BASE MEDIA FILES,
AT LEAST ONE INSTRUCTION REPRESENTING A MEDIA EFFECT TO BE APPLIED TO THE ONE OR MORE BASE MEDIA FILES, AND A GENERIC OUTPUT FORMAT ADAPTABLE TO THE SELECTED OUTPUT SPECIFICATION

PROXY EDITING AND RENDERING FOR VARIOUS DELIVERY OUTLETS

BACKGROUND

Conventional desktop software applications operate on computer systems to allow for users, known as film or video editors, to edit digital video content. In particular, non-linear editing is a non-destructive editing method that involves being able to access any frame in a video clip with the same ease as any other. Initially, video and audio data from a media source file can be digitized and recorded directly to a storage device that is local to the computer system, like a desktop personal computer. The media source file can then be edited on the computer using any of a wide range of video editing software. Example edits that can be made to the video include splicing video segments together, applying effects to video, adding subtitles, and the like.

SUMMARY

In conventional non-linear editing, the media source file is not lost or modified during editing. Instead, during the edit process, the conventional desktop software records the decisions of the film editor to create an edit decision list. An edit decision list is a way of representing a video edit. It can contain an ordered list of reel and timecode data representing how to manipulate the locally stored media source file in order to properly render the edited video. In other words, the edit decision list can describe the editing steps the conventional desktop software application must perform on the locally stored media source file in order to completely generate and store a complete full version of the edited video file prior to playing the edited video.

Conventional techniques for non-linear editing suffer from a variety of deficiencies. For example, conventional techniques require that the film editor understands and provides the exact output specifications required for the final output format of the edited video file through a specific delivery channel. If the film editor wishes to create an edited video file for delivery to mobile (e.g. wireless) devices, the film editor must fully render the edited video file in accordance with the mobile specifications. If the film editor seeks to deliver the same edited video file via another mode of delivery, such as broadcast television, then the edited video file must be fully rendered again, but in accordance with the broadcast television specifications. In both use cases, the film editor must provide the desired output specifications and render the edited video file according to the desired output specifications. Therefore, such conventional techniques consume vast processing resources and involve rendering redundancy. In addition, the conventional video editor has to specify and provide the output formats.

Techniques discussed herein significantly overcome the deficiencies of conventional applications such as those discussed above as well as additional techniques also known in the prior art. As will be discussed further, certain specific embodiments herein are directed to a proxy media editor embedded with updateable output specifications for a variety of delivery channels. By combining editing and server-side rendering with output specifications in one unified platform, a user can create a single edited video composition in a hosted web-based environment which can dynamically meet the exact requirements of various delivery channels (e.g. online video, mobile, high definition television, digital video disc (D.V.D.)). Thus, the proxy media editor optimizes the editing experience by allowing viewers of the video to choose video output formats and delivery channels as playback of the video is invoked.

Another advantage provided by the proxy media editor is the optimization of the performance experience. In other words, a film editor can create and edit a media presentation in a format having a low quality pixel output format, thereby efficiently utilizing processing resources. However, by employing the proxy media editor, the film editor can obtain an output format for the same media presentation with a higher quality pixel format—such as high definition television.

For example, a film editor can create an edited video (e.g. media presentation, media output) and store the corresponding edit decision list (E.D.L.) associated with the edited video on a server system of the proxy media editor. It is understood that the E.D.L. can then be or combined with the original base media files so the media presentation can be configured for any one or a number of various output formats that meet specifications of different delivery channels. The proxy media editor allows a user to view the edited film via a plurality delivery channels. If a user wishes to view the edited video via a video player on a mobile telephone (e.g. cell phone), the user can access the proxy media editor over the Internet and request that the edited video be sent to the mobile telephone.

In response to the request for delivery of the edited video to a mobile telephone's video player, the proxy media editor applies output specifications for mobile devices. The edited video is rendered at the proxy media editor (e.g. server-side rendering) by executing the E.D.L. in accordance with the output specifications for mobile devices. Therefore, a version of the edited video is compatible with the mobile telephone's video player even though the film editor who created that edited video did not provide the particular output specifications.

The edit decision list can thus instruct the server to retrieve and aggregate one or more video, audio, and graphics files (i.e. base media) into a continuous video. Such files can each reside at universal resource locators (U.R.L). within an asset management system (e.g., digital library) accessible by the server throughout the Internet. Hence, the edit decision list can instruct the server to locate, collect and/or stream video, audio, and graphics files and to further modify, edit, sequence and layer the base media files accordingly.

Specifically, the proxy media editor accesses at least one output specification and an edit decision list stored on a server system. The proxy media editor receives a request for media output at the server system. The proxy media editor renders, at the server system, the media output according to an output specification and an edit decision list. The proxy media editor delivers, from the server system, the media output via a media delivery channel compatible with the output specification. Thus, a user can create a single edited video composition in a hosted web-based environment which can dynamically meet the exact requirements of various delivery channels.

Once the base media and the edit decision list are fully rendered into the edited video with a particular output specification, the edited video for that output specification can be stored. In one embodiment, the proxy media editor can create a new video file (such as a Flash video file) via combining the E.D.L. and the base media according to the output specification of a particular delivery channel. In another embodiment, "on the fly" rendering can be implemented such that no actual video file is created. In other words, the proxy media editor applies the output specification that corresponds to the delivery channel of the user who is currently requesting video playback—as the E.D.L. and base media are combined.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif., U.S.A., herein after referred to as "Adobe" and "Adobe Systems."

BRIEF DESCRIPTION OF THE DRAWINGS

The foregoing and other objects, features and advantages of the invention will be apparent from the following more particular description of embodiments of the methods and apparatus for a proxy media editor configured to combine editing, rendering, and a plurality of output specifications via a unified platform, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

A method, apparatus and computer program product provides for a proxy media editor to combine editing, rendering, and a plurality of output specifications via a unified platform. The proxy media editor accesses at least one output specification and an edit decision list stored on a server system. The proxy media editor receives a request for media output at the server system, the media output associated with an edit decision list stored on the server system. The proxy media editor renders, at the server system, the media output according to the output specification and the edit decision list. The proxy media editor delivers, from the server system, the media output via a media delivery channel compatible with the output specification. Thus, a user can create a single edited video composition in a hosted web-based environment which can dynamically meet the exact requirements of various delivery channels—even though the user that created the edited video composition did not provide output specifications or necessarily envision the various delivery channels to which the media presentation may ultimately be delivered.

Additionally, the proxy media editor can provide the advantage of conserving the use of processing resources by allowing a user to edit media (i.e. video) at a lower quality (e.g. downsampled proxy) and then ultimately deliver the output at a higher quality level by applying the edits to convert the "edited" video to a higher quality than the original base media used to create the video. Thus, by editing online to create the EDL with downsampled (i.e. low quality) base media, the proxy media editor can then apply that EDL to the "actual" original base media when rendering (i.e. "flattening") the file according to a particular output specification so a higher quality edited version can be delivered via broadcast or HDTV, for example.

Finally, it is understood that the system disclosed herein can be utilized within a rich media player and server such as a Flash Player and Flash Media Sever which are software products made by Adobe Systems Incorporated of San Jose, Calif., USA.

The following discussion relates to creating the edit decision list (E.D.L.) that will be stored at a server associated with the proxy media editor. The edit decision list can be an XML-based text file that contains instructions and information for the server associated with the proxy media editor as to video edits, video sequencing, file layering and audio data that can be applied to base media (i.e. the original video) to ultimately present an edited version of the original video to the user. The server system never needs to persistently store the edited version, but only needs to have the original unedited media (including video, images, audio, and the like) and the edit decision list that indicates what edits are to be made to the original video to reproduce the edited version during real time application of the edit decision list to the original video. Once the base media and the edit decision list are fully rendered into the edited video with a particular output specification, the edited video for that output specification can be stored. In one embodiment, the proxy media editor can create a new video file (such as a Flash video file) via combining the E.D.L. and the base media according to the output specification of a particular delivery channel. In another embodiment, "on the fly" rendering can be implemented such that no actual video file is created. In other words, the proxy media editor applies the output specification that corresponds to the delivery channel of the user who is currently requesting video playback—as the E.D.L. and base media are combined.

The edit decision list can be a hyperlink or include many hyperlinks to resources (e.g. such as video clips, editing effects, and the like) that reside on a network such as the Internet. In addition to the edit decision list, the user can also receive a media effect that can include effects, graphics and transitions that can be applied to the base media.

The base media can be an aggregate of individual video, audio, and graphics files stitched together into a continuous video as defined by the edits encoded into the edit decision list. Such files can each reside at universal resource locators (U.R.L). within an asset management system (e.g., digital library) related to the server or even throughout many different computer systems on the Internet. Hence, the edit decision list can instruct the server to locate and to collect video, audio, and graphics files and to further sequence and layer the files accordingly.

As the base media, such as a stitched continuous video, gets aggregated, it is received and processed at a rendering engine local to the server in order to present the video in an edited version. Both the edit decision list and media effects are executed upon the base media. The base media is thus the original video and the server obtains the edit decision list and "executes" the edit instructions of the E.D.L contained therein upon the base media.

Figure 1:
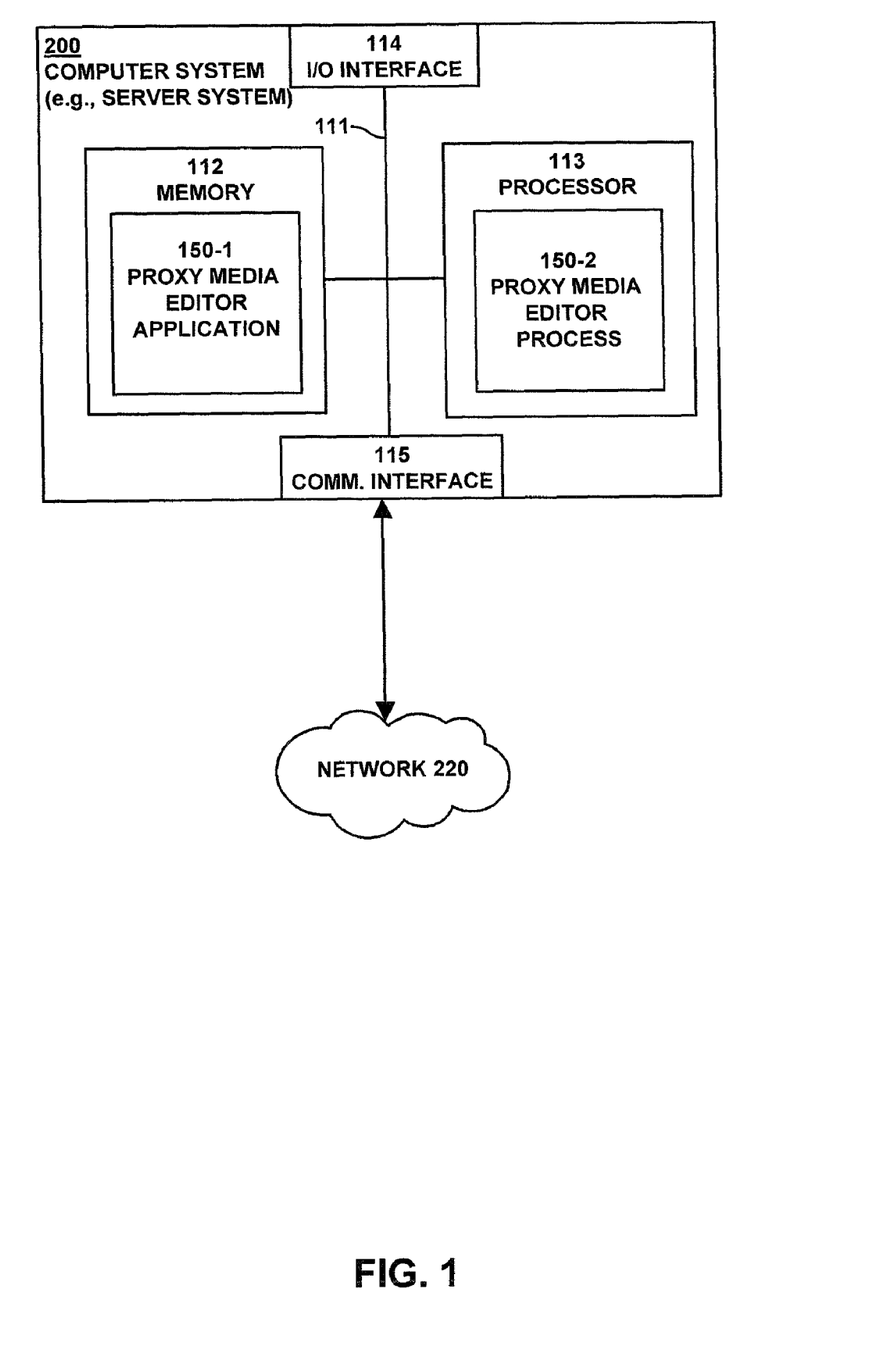
FIG. 1 is a block diagram of the computer system configured with a proxy media editor according to embodiments herein.

Turning now to FIG. 1, a block diagram of a computer system 200 configured with a proxy media editor 150 according to embodiments herein is presented. Specifically a block diagram is illustrated to provide an example architecture of a computer system 200 (i.e. server system) that executes, runs, interprets, operates or otherwise performs a proxy media editor application 150-1 and proxy media editor process 150-2 (e.g. an executing version of the application 150-1) configured in accordance with embodiments of the invention to produce a rendered edited video according to one or more particular output specifications (e.g. mobile device, high definition television, online video sharing).

The computer system 200 may be any type of computerized device such as a personal computer, workstation, portable computing device, console, laptop, network terminal or the like. As shown in this example, the computer system 200 is a server system which includes an interconnection mechanism 111 such as a data bus, motherboard or other circuitry that couples a memory system 112, a processor 113, an input/output interface 114, and a communications interface 115 that can interact with a network 220 (e.g. LAN, WAN, Internet).

The memory system 112 is any type of computer readable medium and in this example is encoded with an proxy media editor application 150-1 that supports generation, display, and implementation of functional operations as explained herein. During operation of the server system 200, the processor 113 accesses the memory system 112 via the interconnect 111 in order to launch, run, execute, interpret or otherwise perform the logic instructions of the proxy media editor application 150-1. Execution of the proxy media editor application 150-1 in this manner produces processing functionality in a proxy media editor process 150-2. In other words, the process 150-2 represents one or more portions or runtime instances of the application 150-1 (or the entire application 150-1) performing or executing within or upon the processor 113 in the server system 200 at runtime.

Figure 2:
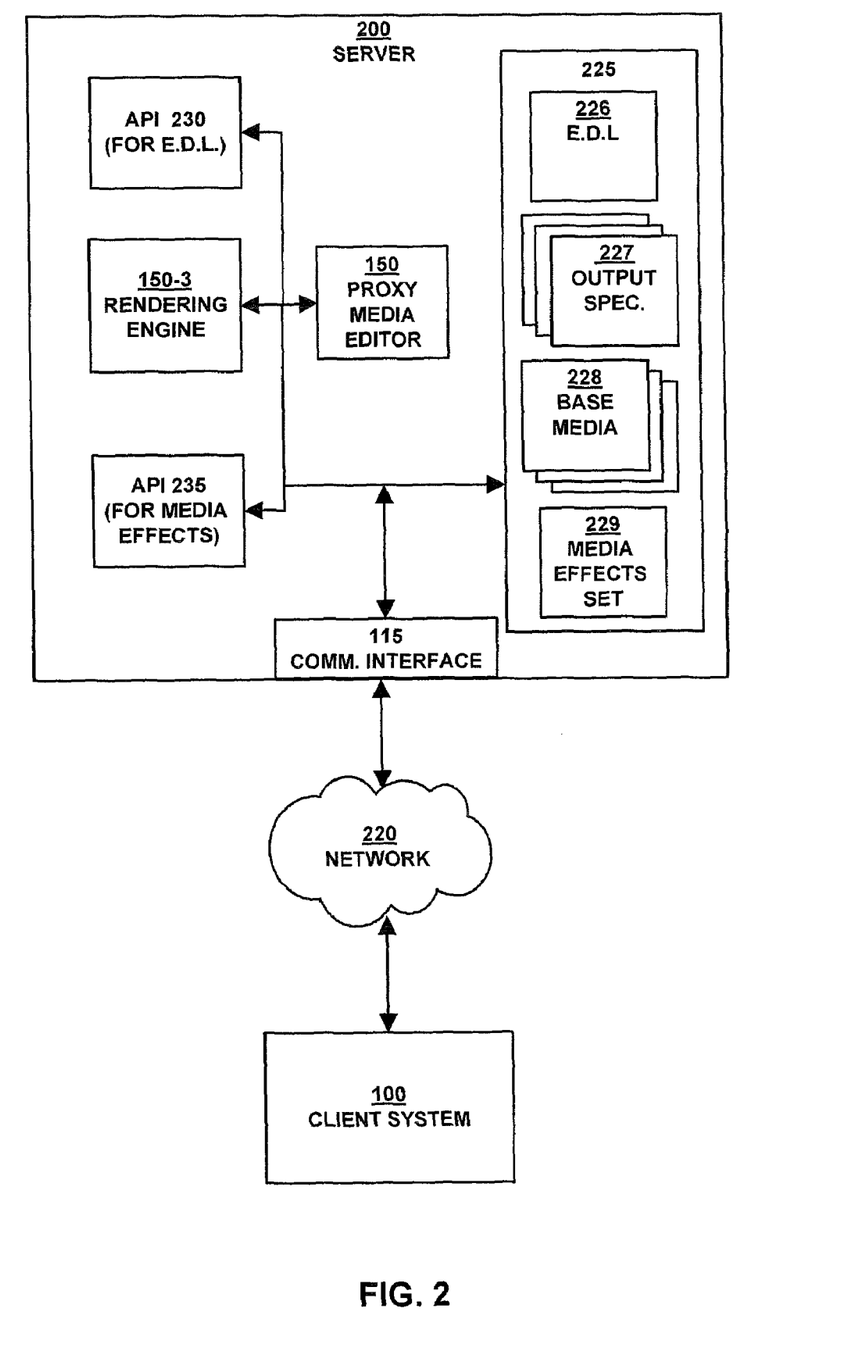
FIG. 2 is a block diagram of the computer system configured with a proxy media editor according to embodiments herein.

FIG. 2 is a block diagram of the computer system configured with a proxy media editor 150 according to embodiments herein. The computer system of FIG. 2 is a server system 200 associated with the proxy media editor 150. In the alternative, the server system 200 includes the proxy media editor 150, and/or the proxy media editor 150 itself can include the server system 200. The server system 200 can also include an asset management system 225 to store an edit decision list (E.D.L.) 226, at least one output specification 227, base media 228, and media effects set 229 (where a media effects set can include one or more media effects). The server system 200 further includes the proxy media editor 150, a rendering engine 150-3 of the proxy media editor 150, and an application programming interface 230, 235 for the edit decision list 226 and the media effects set 229. The server system 200 interacts with a network 220 via a communications interface 115 to receive requests from a client system 100.

A user can send a request for media output (such as video formatted for a specific delivery channel) from the client system 100 to the proxy media editor 150 via a network 220 (e.g. the Internet). For example, the client system 100 can launch a web browser at the client system 100 that communicates with the server 200 and, thereby, the proxy media editor 150. The user can send the request for the media output (such as media for a mobile device) to the proxy media editor 150 via a selection of a particular output specification at the web browser.

In response to receiving the user's request for a particular video for delivery to a mobile device, the proxy media editor 150 can search for and access the edit decision list (E.D.L.) 226 in the asset management system 225 and further search for the appropriate output specification 227 as indicated in the user's request (e.g. mobile device output specification). The proxy media editor 150 utilizes the rendering engine 150-3 to apply the user requested output specification 227 to the edit decision list (E.D.L.) 226. The rendering engine 150-3 further executes the E.D.L. 226 in accordance with the output specification 227 (e.g. mobile device output specification) and delivers the requested media output to a mobile device.

It is understood that a media effects set 229 can include one or more video effects, graphics and transitions that can be applied to the base media As an example, the user can add an opening title screen with a transition to the initial frame of the edited video. Also, the user can add subtitles throughout the frames of the edited video wherever dialogue occurs. Other media effects can involve converting various potions of a video to 'black-and-white,' and some media effects can provide audio effects and/or embellishments.

The asset management system 225 can be utilized for managing content for the web. The asset management system can manage content (text, graphics, links, etc.) for distribution on a web server (e.g Flash Media Server). Thus, the asset management system 225 can also include software where users can create, edit, store, retrieve, and manage content with relative ease of use. Such an asset management system 225 can use a database, for example, to catalog and store content, and a presentation layer displays the content to regular website visitors based on a set of templates.

Further details of configurations explained herein will now be provided with respect to flow charts of processing steps that show the high level operations disclosed herein to perform the proxy media editor process 150-2, as well as graphical representations that illustrate implementations of the various configurations of the proxy media editor process 150-2.

Figure 3:
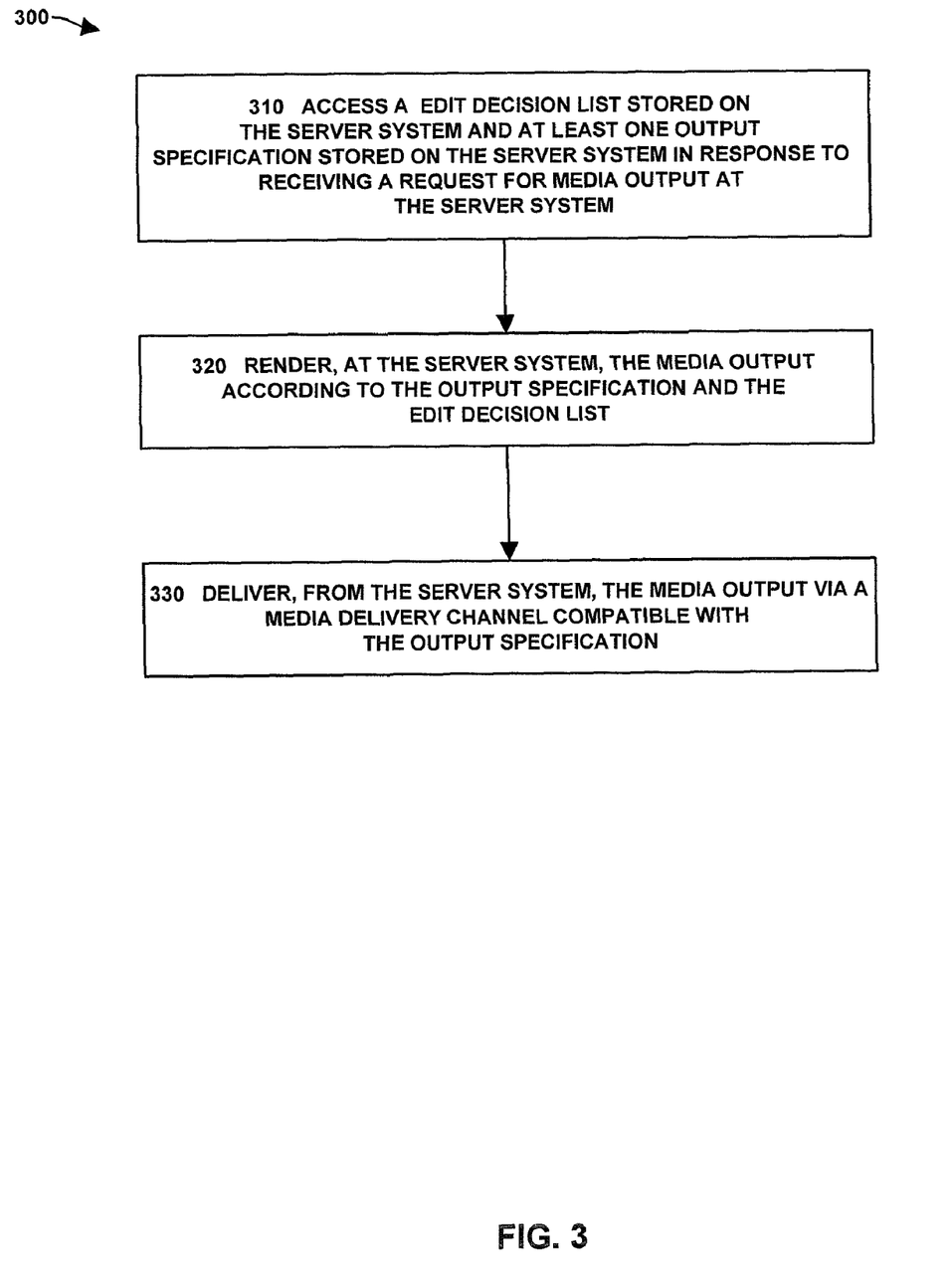
FIG. 3 is a flowchart of processing steps performed by the proxy media editor.

FIG. 3 is a flowchart of processing steps performed by the proxy media editor 150 according to embodiments herein. The steps in flowchart 300 relate to the features as illustrated in the block diagrams of FIGS. 1 and 2. At step 310, the proxy media editor 150 accesses an edit decision list stored on the server system and at least one output specification stored on the server system in response to receiving a request for media output at the server system. At step 320, the proxy media editor 150 renders, at the server system, the media output according to the output specification and the edit decision list. At step 330, the proxy media editor 150 delivers, from the server system, the media output via a media delivery channel compatible with the output specification. Further, it is understood that once the media output has been rendered in accordance with a user selected output specification, the file of the rendered media output based on the user selected output specification can be saved in the asset management system 225 for future use and distribution.

Thus, by combining editing and rendering with the user selected output specification requirements in one unified platform (i.e. the server system 200 with the proxy media editor 150), the user can create an edited video composition in a hosted web-based environment that enables final output to be shared and/or delivered to a variety of platforms (i.e. output formats, delivery channels).

Figure 4:
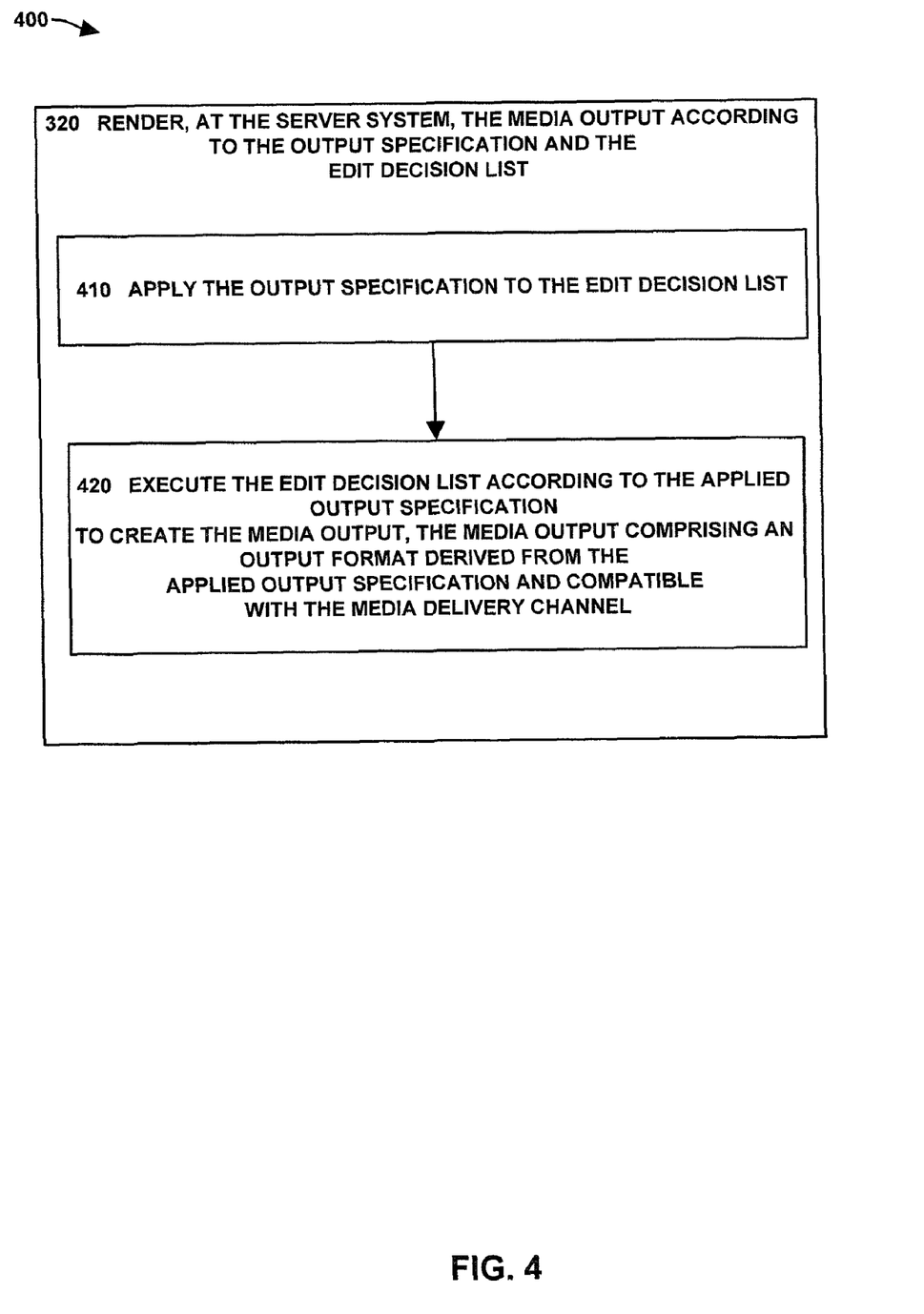
FIG. 4 is a flowchart of processing steps performed by the proxy media editor to render media output according to an output specification and an edit decision list according to embodiments herein.

FIG. 4 is a flowchart of processing steps performed by the proxy media editor 150 to render media output according to an output specification and an edit decision list according to embodiments herein. The steps in flowchart 400 relate to the features as illustrated in the block diagrams of FIGS. 1 and 2 and, in particular, to the step 310 of the proxy media editor 150 storing at least one output specification on a server system. At step 410, the proxy media editor 150 applies the output specification to the edit decision list 226. Thus, the applied output specification replaces the generic output format of the edit decision list 226 to ensure that the rendered media output will be created in a file that is compatible with a delivery channel that recognizes the applied output specification.

At step 420, the proxy media editor 150 executes the edit decision list according to the applied output specification to create the media output, the media output comprising an output format derived from the applied output specification and compatible with the media delivery channel.

For instance, the instructions of the E.D.L. 226 are executed to retrieve the base media 228 of the requested video (e.g. media output). By execution of the E.D.L., at least one of the video base file, image base file and/or an audio base file is collected from at least one universal resource locator (URL). Any URL on the Internet can be used to locate and collect the files. Specifically, the proxy media editor 150 can execute instructions related to the edit decision list 226 from the server 200 to locate media files and media data from any given URL(s) that can be used for the base media. In the alternative, such files and data can already be stored in a digital library or digital asset management system 225 related to the server 200. Further, the proxy media editor 150 can sequence any video base file, image base file and the audio base file according to the instructions in the edit decision list 226. Thus, the edit decision list 226 can provide information regarding how to order the various video, image, and audio files to make up the base media. It is also understood that sequencing can include inserting one file at a certain point within another file. In other words, an image file can be sequenced to appear half way into a video file.

One or more media effects in a media effects set 229 can also be retrieved and applied to the base media files to further the rendering of the requested media output. As the E.D.L. 226 is executed and the output specification is applied, the generic output format of the E.D.L. 226 adapts to the output specification 227 to create a version of the media output in a particular delivery format for the requested video (i.e. media output).

Figure 5:
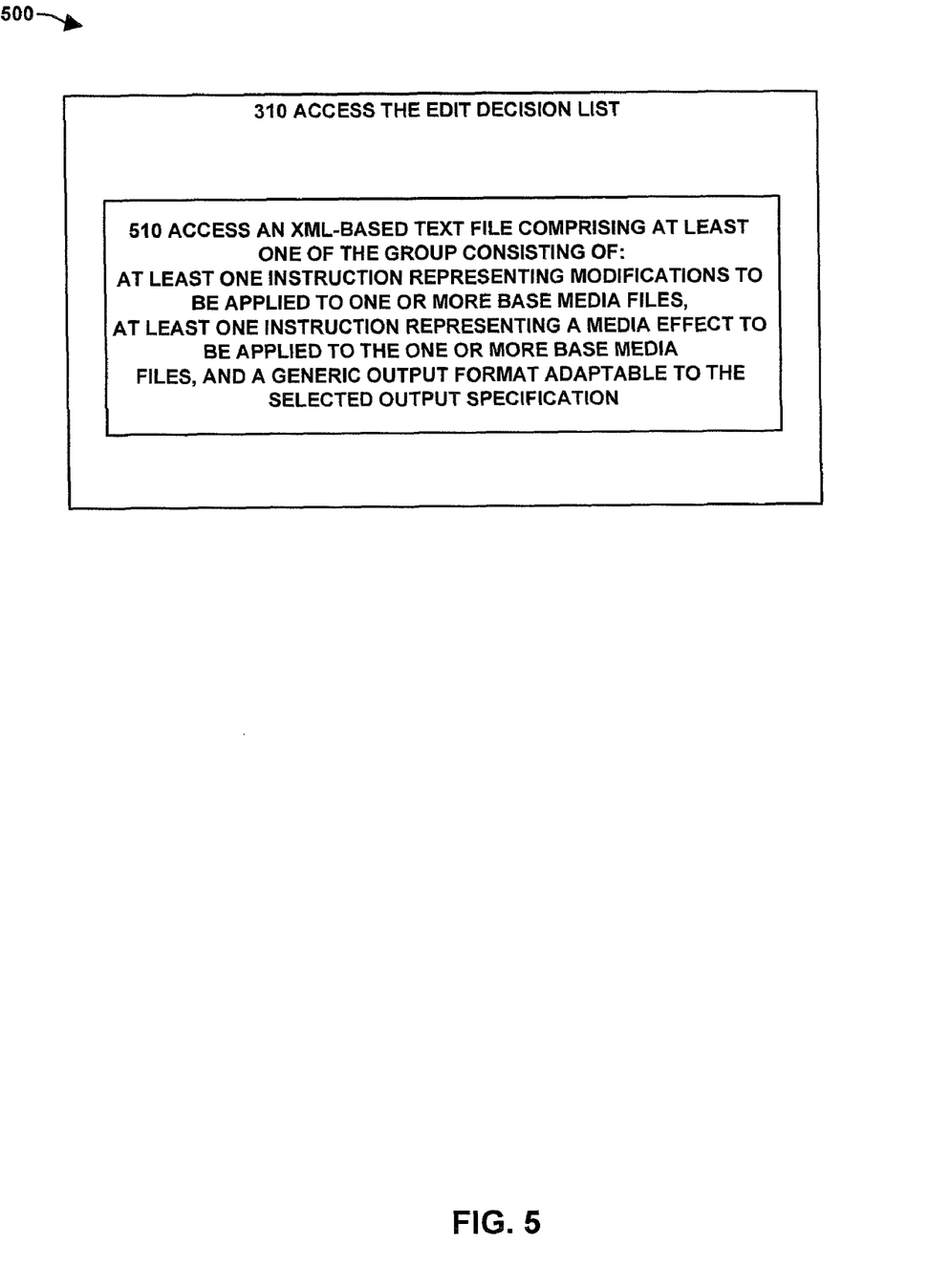
FIG. 5 is a flowchart of processing steps performed by the proxy media editor to access an edit decision list stored on a server system according to embodiments herein.

FIG. 5 is a flowchart of processing steps performed by the proxy media editor 150 to access an edit decision list stored on a server system according to embodiments herein. The steps in flowchart 500 relate to the features as illustrated in the block diagrams of FIGS. 1 and 2 and, in particular, to the step 310 of the proxy media editor 150 accessing the edit decision list.

At step 510, the proxy media editor 150 accesses an XML-based text file comprising at least one of the group consisting of at least one instruction representing modifications to be applied to one or more base media files, at least one instruction representing a media effect to be applied to the one or more base media files, and a generic output format adaptable to the selected output specification. The edit decision list 226 can be an XML-based text file. XML (Extensible Markup Language) is a flexible way to create common information formats and share both the format and the data on the World Wide Web, intranets, and elsewhere. Such a standard way of describing data enables a user to send an intelligent agent (a program) to each computer maker's Web site, gather data, and then make a valid comparison. XML can be used by any individual or group of individuals or companies that wants to share information in a consistent way.

Figure 6:
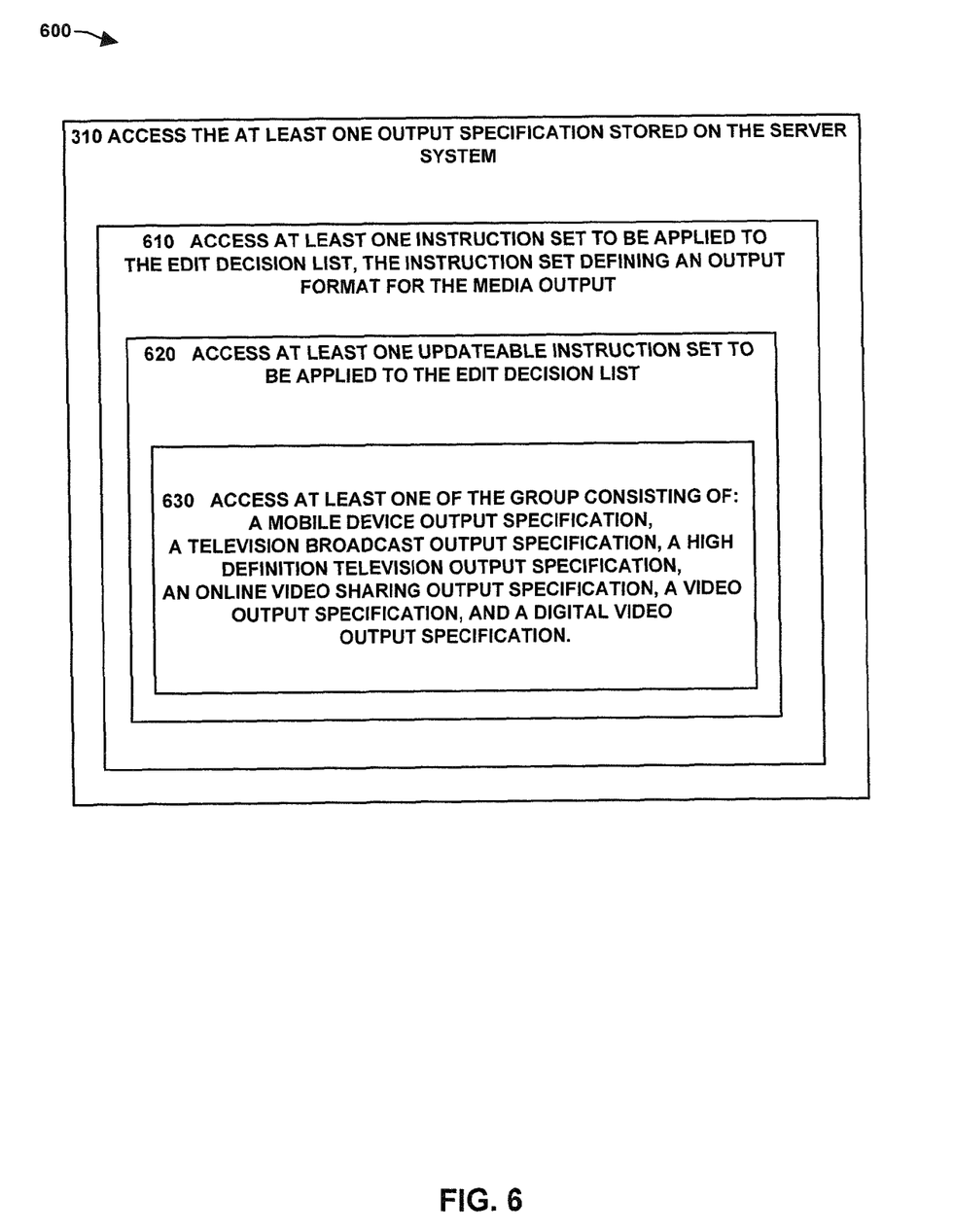
FIG. 6 is a flowchart of processing steps performed by proxy media editor to access an output specification stored on a server system according to embodiments herein.

FIG. 6 is a flowchart of processing steps performed by proxy media editor 150 to access an output specification stored on a server system according to embodiments herein. The steps in flowchart 600 relate to the features as illustrated in the block diagrams of FIGS. 1 and 2 and, in particular, the step 310 of the proxy media editor 150 accessing an output specification stored on the server system.

At step 610, the proxy media editor 150 accesses at least one instruction set to be applied to the edit decision list, the instruction set defining an output format for the media output. In particular, at step 620, the proxy media editor 150 accesses at least one updateable instruction set to be applied to the edit decision list 226. An updateable instruction set embodies the concept of extensibility. A person having ordinary skill in the art would recognize that extensibility is a system design principle where the implementation takes into consideration future modification and enhancement. Extensions can be through the addition of new functionality or through the modification of existing functionality while minimizing the impact to existing system functions. Extensibility can also mean that a system has been so architected that the design includes mechanisms for expanding/enhancing the system with new capabilities without having to make major changes to the system infrastructure. Extensibility can also mean that a software system's behavior is modifiable at runtime, without recompiling or changing the original source code. Thus, an updateable instruction set is, in other words, extensible.

Specifically, at step 630, the proxy media editor 150 accesses at least one of the group consisting of: a mobile device output specification, a television broadcast output specification, a high definition television output specification, an online video sharing output specification, a video output specification, and a digital video output specification. It is understood that the proxy media editor 150 can provide for various output specification not mentioned in this list.

Figure 7:
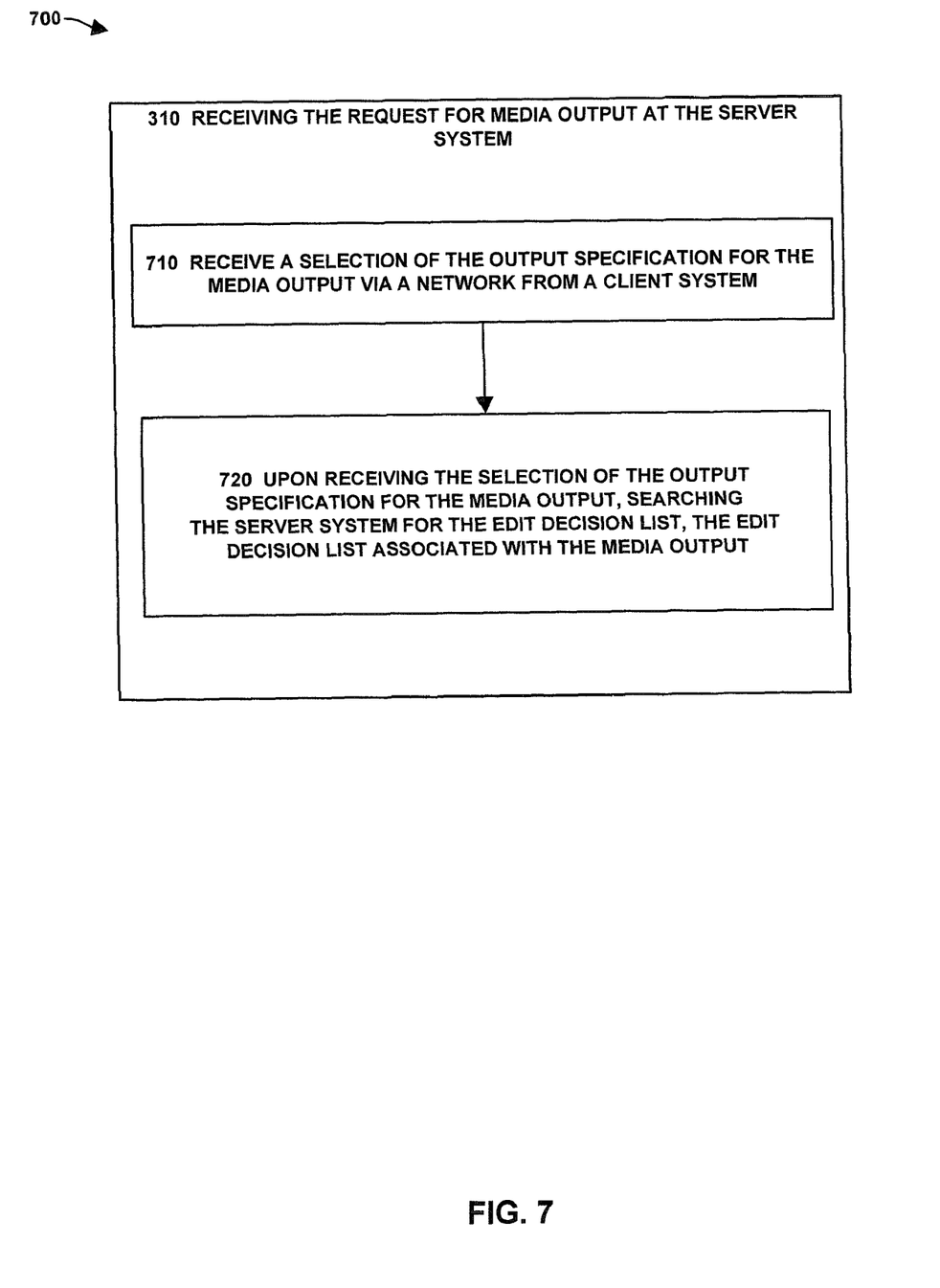
FIG. 7 is a flowchart of processing steps performed by proxy media editor to receive a request for media output at a server system according to embodiments herein.

FIG. 7 is a flowchart of processing steps performed by proxy media editor to receive a request for media output at a server system according to embodiments herein. The steps in flowchart 700 relate to the features as illustrated in the block diagrams of FIGS. 1 and 2 and, in particular, the step 310 of the proxy media editor 150 receiving a request for media output at the server system.

At step 710, the proxy media editor 150 receives a selection of the output specification for the media output via a network 200 from a client system 100. At step 720, the proxy media editor 150 upon receiving the selection of the output specification for the media output, searches the server system 200 for the edit decision list 226, the edit decision list 226 associated with the media output. The edit decision list 226 represents the instructions to create the media output. Thus, no actual file of the media output is required to be stored on the server 200 in order for a user to request and receive the media output in a particular output format.

It is understood that the proxy media editor 150 works in conjunction with or includes a server system 200. The server system 200 can be Flash Media Server that runs Flash based applications using RTMP (Real Time Messaging Protocol). The Flash Media Server (FMS) can send and receive data to and from users, and clients 100 can call remote procedures on the server-side. Similarly the server can call methods on specific clients. The Flash Media Server allows users to receive and publish net streams. When viewing a net stream the user can either create their own to view a remotely stored FLV video or the server can instantiate a net stream and play a video on it. A FMS can also connect to various external services including J2EE, web services, XML Sockets and ASP.NET application servers. This connectivity allows an FMS application to take advantage of features such as database connectivity, email etc.

Note again that techniques herein are well suited for a proxy media editor to combine editing, rendering, and a plurality of output specifications via a unified platform. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method, comprising:
accessing, by an application executed by a processor, an edit decision list and at least one output specification specifying an output format compatible with a media delivery channel in response to receiving a request for media content, wherein the edit decision list comprises at least one instruction to generate the media content using one or more base media files and an instruction identifying a generic format for the media content, wherein the media content comprises audiovisual content to be provided via the media delivery channel;
applying, by the application, the at least one output specification to the edit decision list, wherein applying the at least one output specification comprises replacing the instruction identifying the generic format with an instruction identifying the output format specified in the at least one output specification;
executing, by the application, the edit decision list according to the applied output specification to generate the media content in an output format compatible with the media delivery channel; and
providing, by the application, the media content via the media delivery channel.

2. The method as in claim 1, wherein accessing the edit decision list includes accessing an XML-based text file comprising at least one of:
at least one instruction to retrieve the one or more base media files, at least one instruction to re-sequence audiovisual content from the one or more base media files, and at least one instruction to apply a media effect to the one or more base media files.

3. The method as in claim 1, wherein accessing the at least one output specification comprises system includes:
accessing at least one instruction set to be applied to the edit decision list, the at least one instruction set defining the output format for the media content.

4. The method as in claim 3, wherein accessing the at least one instruction set to be applied to the edit decision list includes:
accessing at least one updateable instruction set to be applied to the edit decision list.

5. The method as in claim 4, wherein accessing the at least one updateable instruction set to be applied to the edit decision list includes accessing at least one of:
a mobile device output specification, a television broadcast output specification, a high definition television output specification, an online video sharing output specification, a video output specification, and a digital video output specification.

6. The method as in claim 1, wherein accessing the at least one output specification comprises:
retrieving the at least one output specification from a database system.

7. The method as in claim 1, wherein receiving the request for media content comprises:
receiving a selection of the at least one output specification for the media content via a network from a client system.

8. A non-transitory computer readable medium comprising executable instructions encoded thereon operable on a computerized device to perform processing comprising:
instructions for accessing an edit decision list and at least one output specification specifying an output format compatible with a media delivery channel in response to receiving a request for media content wherein the edit decision list comprises at least one instruction to modify one or more base media files and an instruction identifying a generic format, wherein the media content comprises audiovisual content to be provided via the media delivery channel;
instructions for applying the at least one output specification to the edit decision list, wherein applying the at least one output specification comprises replacing the instruction identifying the generic format with an instruction identifying the output format specified in the at least one output specification;
instructions for executing the edit decision list according to the applied output specification to generate the media content in an output format compatible with the media delivery channel; and
instructions for providing the media content via the media delivery channel.

9. The computer readable medium as in claim 8, wherein the instructions for accessing the edit decision list include instructions for accessing an XML-based text file which includes at least one of:
at least one instruction to retrieve the one or more base media files, at least one instruction to re-sequence audiovisual content from the one or more base media files, and at least one instruction to apply a media effect to the one or more base media files.

10. The computer readable medium as in claim 8, wherein the instructions for accessing the at least one output specification comprise:
  instructions accessing at least one instruction set to be applied to the edit decision list, the at least one instruction set defining an output format for the media content.

11. The computer readable medium as in claim 10, wherein the instructions for accessing the at least one instruction set to be applied to the edit decision list comprise:
  instructions for accessing at least one updateable instruction set to be applied to the edit decision list.

12. The computer readable medium as in claim 11, wherein the instructions for accessing the at least one updateable instruction set to be applied to the edit decision list comprise instructions for accessing at least one of:
  a mobile device output specification, a television broadcast output specification, a high definition television output specification, an online video sharing output specification, a video output specification, and a digital video output specification.

13. The computer readable medium as in claim 8, wherein the instructions for accessing the at least one output specification comprise:
  instructions for retrieving the at least one output specification from a database system.

14. The computer readable medium as in claim 8, wherein the instructions for receiving the request for media content comprise:
  instructions for receiving a selection of the at least one output specification for the media content via a network from a client system.

15. A computer system comprising:
  a processor;
  a memory unit that stores instructions associated with an application executed by the processor; and
  an interconnect coupling the processor and the memory unit, enabling the computer system to execute the application and perform operations of:
    accessing an edit decision list specifying an output format compatible with a media delivery channel and at least one output specification in response to receiving a request for media content, wherein the edit decision list comprises at least one instruction to modify one or more base media files and an instruction identifying a generic format, wherein the media content comprises audiovisual content to be provided via the media delivery channel;
    applying the at least one output specification to the edit decision list, wherein applying the at least one output specification comprises replacing the instruction identifying the generic format with an instruction identifying the output format specified in the at least one output specification;
    executing the edit decision list according to the applied output specification to generate the media content in an output format compatible with the media delivery channel; and
    providing the media content via the media delivery channel.

16. The computer system of claim 15, wherein accessing the edit decision list includes accessing an XML-based text file comprising at least one of:
  at least one instruction to retrieve the one or more base media files, at least one instruction sequencing audiovisual content from the one or more base media files, and at least one instruction applying a media effect to the one or more base media files.

17. The computer system of claim 15, wherein accessing the at least one output specification includes:
  retrieving the at least one output specification from a database system.

18. The method of claim 1, wherein executing the edit decision list according to the applied output specification to generate the media content comprises rendering, by the application, one or more audiovisual content items from the one or more base media files as specified by the edit decision list.

19. The method of claim 1, wherein executing the edit decision list according to the applied output specification to generate the media content comprises:
  generating, by the application, an output media file, wherein the output file comprises one or more audiovisual content items from the one or more base media files combined as specified by the edit decision list; and
  rendering, by the application, the output media file.

* * * * *